United States Patent
Shiokawa et al.

(10) Patent No.: US 10,991,961 B2
(45) Date of Patent: Apr. 27, 2021

(54) FUEL CELL SYSTEM AND OXIDE LAYER REMOVAL METHOD

(71) Applicant: TOYOTA JIDOSHA KABUSHIKI KAISHA, Toyota (JP)

(72) Inventors: Satoshi Shiokawa, Okazaki (JP); Takahiko Hasegawa, Toyota (JP); Kohei Oda, Toyota (JP); Satoshi Watanabe, Okazaki (JP); Shuhei Nakamura, Miyoshi (JP); Norihiro Fukaya, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 16/288,412

(22) Filed: Feb. 28, 2019

(65) Prior Publication Data

US 2019/0280317 A1    Sep. 12, 2019

(30) Foreign Application Priority Data

Mar. 9, 2018   (JP) .............................. JP2018-042783

(51) Int. Cl.
| | |
|---|---|
| *H01M 8/04223* | (2016.01) |
| *H01M 8/2404* | (2016.01) |
| *H01M 8/04858* | (2016.01) |
| *H01M 4/90* | (2006.01) |
| *H01M 8/242* | (2016.01) |
| *H01M 8/1018* | (2016.01) |

(52) U.S. Cl.
CPC ......... *H01M 8/04223* (2013.01); *H01M 4/90* (2013.01); *H01M 8/04873* (2013.01); *H01M 8/242* (2013.01); *H01M 8/2404* (2016.02); *H01M 2008/1095* (2013.01)

(58) Field of Classification Search
CPC ...................... H01M 8/04223; H01M 8/04992
See application file for complete search history.

(56) References Cited

U.S. PATENT DOCUMENTS

| | | | |
|---|---|---|---|
| 2015/0086890 A1* | 3/2015 | Ikeda | ................ H01M 8/04671 429/428 |
| 2015/0125772 A1* | 5/2015 | Matsusue | ........... H01M 8/04611 429/432 |

FOREIGN PATENT DOCUMENTS

| | | |
|---|---|---|
| JP | 2012-185968 A | 9/2012 |
| JP | 2013-254619 A | 12/2013 |
| JP | 2017-098003 A | 6/2017 |

* cited by examiner

*Primary Examiner* — Ladan Mohaddes

(74) *Attorney, Agent, or Firm* — Dickinson Wright PLLC

(57) ABSTRACT

A fuel cell system includes a removal treatment execution unit configured to execute an oxide layer removal treatment that removes an oxide layer generated on a catalyst of a fuel cell. The removal treatment execution unit is configured to execute the oxide layer removal treatment by adjusting a voltage of the fuel cell to be within a predetermined second voltage range lower than a predetermined first voltage range that is lower than an open-circuit voltage, when an operation of the fuel cell system shifts from a first operation, where a current value of the fuel cell is zero and the flow rate is controlled to maintain the voltage of the fuel cell within the first voltage range, to a second operation, where the current value is larger than zero and the flow rate is controlled in response to an output request to the fuel cell.

4 Claims, 7 Drawing Sheets

FUEL CELL SYSTEM AND OXIDE LAYER REMOVAL METHOD

INCORPORATION BY REFERENCE

The disclosure of Japanese Patent Application No. 2018-042783 filed on Mar. 9, 2018 including the specification, drawings and abstract is incorporated herein by reference in its entirety.

BACKGROUND

1. Technical Field

The present disclosure relates to a fuel cell system and an oxide layer removal method. The present disclosure particularly relates to removal of an oxide layer on a catalyst included in a fuel cell.

2. Description of Related Art

An oxide layer may be generated on a catalyst used in an electrode of a fuel cell. When the oxide layer is generated, catalytic performance deteriorates, and power generation efficiency of the fuel cell decreases. Accordingly, a method has been proposed that reduces and removes the oxide layer by lowering the voltage of the fuel cell to a very low value (see Japanese Patent Application Publication No. 2012-185968 (JP 2012-185968 A)).

SUMMARY

However, in the method disclosed in JP 2012-185968 A, the voltage of the fuel cell is lowered during execution of an intermittent operation that is an operation to intermittently supply a small amount of oxidant gas to the fuel cell so as to maintain the voltage of the fuel cell in a specified voltage range. Hence, at the time of increasing the voltage of the fuel cell after the oxide layer is removed, it takes a long time to increase the voltage to a specified voltage range due to the flow rate of the oxidant gas being low. This results in a low voltage return response. It is generally known that a reduced catalyst easily dissolves when the voltage of the fuel cell increases again after the reduction. The phenomenon of easy dissolution of the catalyst occurs more as a period of time, when the fuel cell is in a low voltage state, is longer. Hence, the method disclosed in JP 2012-185968 A has a problem of the easy dissolution of the catalyst. Assume the case where an oxide layer is removed while a large amount of oxidant gas is supplied, that is, for example, during normal operation. In this case, if the current of the fuel cell is increased in order to lower the voltage of the fuel cell, the current of the fuel cell, which is already large due to being in normal operation, needs to be increased more. Consequently, a large amount of reactant gas is used to increase the current, which causes a problem of deteriorated fuel efficiency. Accordingly, a technique is required that can suppress deterioration in fuel efficiency, while enhancing voltage return response after the treatment of removing an oxide layer.

(1) An aspect of the present disclosure relates to a fuel cell system including: a fuel cell, an oxidant gas supply unit, a flow rate control unit, and a removal treatment execution unit. The fuel cell includes a catalyst. The oxidant gas supply unit supplies oxidant gas to the fuel cell. The flow rate control unit is configured to control a flow rate of the oxidant gas supplied to the fuel cell. The removal treatment execution unit executes an oxide layer removal treatment configured to remove an oxide layer generated on the catalyst. The removal treatment execution unit is configured to execute the oxide layer removal treatment by adjusting the voltage of the fuel cell to be within a predetermined second voltage range lower than a predetermined first voltage range that is lower than an open-circuit voltage, when an operation of the fuel cell system shifts from a first operation, where a current value of the fuel cell is zero and the flow rate is controlled to maintain the voltage of the fuel cell within the first voltage range, to a second operation, where the current value is larger than zero and the flow rate is controlled in response to an output request to the fuel cell.

According to the fuel cell system of this aspect, the oxide layer removal treatment is executed when the operation of the fuel cell system shifts from the first operation to the second operation. Hence, the time taken for the voltage of the fuel cell to reach a target voltage after the oxide layer removal treatment is completed can be shortened as compared with the configuration where the oxide layer removal treatment is executed during execution of the first operation, and the voltage return response can be enhanced. Since the flow rate of oxidant gas increases when the first operation shifts to the second operation, the voltage of the fuel cell tends to rise. A target voltage in the second operation is generally lower than the first voltage range. Because of these reasons, the time taken to reach the target voltage after the end of the oxide layer removal treatment can be shortened. When the first operation shifts to the second operation, the current value is very small. Hence, as compared with the configuration where the oxide layer removal treatment is performed during the second operation, the amount of fuel gas required in order to adjust the voltage of the fuel cell to be within the second voltage range can be suppressed, and deterioration in fuel efficiency can be suppressed.

(2) The fuel system of the above aspect may further include a power supply circuit that regulates the current of the fuel cell. The removal treatment execution unit may be configured to execute the oxide layer removal treatment by controlling the power supply circuit to increase the current so as to adjust the voltage of the fuel cell to be within the second voltage range. In such configuration, the oxide layer removal treatment is executed by adjusting the voltage of the fuel cell to be within the second voltage range by increasing the current of the fuel cell. Hence, the time taken to adjust the voltage of the fuel cell to be within the second voltage range can be shortened as compared with the configuration where the voltage of the fuel cell is adjusted to be within the second voltage range by reducing the flow rate of oxidant gas. Therefore, the amount of removal of the oxide layer until the voltage of the fuel cell is adjusted to be within the second voltage range can be reduced, so that a considerable increase in the amount of removal of the oxide layer can be suppressed.

(3) The fuel system of the above aspect may further include a first determination unit configured to determine whether or not a first condition, indicating the state where the amount of the oxide layer generated on the catalyst is equal to or more than a predetermined first amount, is satisfied. The removal treatment execution unit may be configured to execute the oxide layer removal treatment, when the first condition is determined to be satisfied and the operation of the fuel cell system shifts from the first operation to the second operation. In such configuration, the oxide layer removal treatment is executed when the first condition, indicating the state where the amount of the oxide layer generated on the catalyst is equal to or more than the predetermined first amount, is satisfied. Hence, the number of times that the treatment is executed can be reduced as compared with the configuration where the oxide layer removal treatment is executed when the amount of the oxide layer is less than the first amount. This makes it possible to further suppress dissolution of the catalyst attributed to the voltage of the fuel cell lowered at the time of the oxide layer removal treatment.

(4) The fuel system of the above aspect may further include: a current measurement unit; and a second determination unit. The current measurement unit may measure the current of the fuel cell. The second determination unit may be configured to determine whether or not a second condition, indicating the state where the amount of the oxide layer generated on the catalyst is equal to or more than a predetermined second amount that is larger than the first amount, is satisfied. The removal treatment execution unit may be configured to execute the oxide layer removal treatment, when the second operation is in execution, the second condition is determined to be satisfied, and the measured current is equal to or less than a predetermined current threshold. According to this configuration, a considerable increase in the amount of the oxide layer can be suppressed as compared with the configuration where the oxide layer removal treatment is not executed when shift from the first operation to the second operation is not executed at all. Since the oxide layer removal treatment is executed when a measured current is equal to or less than a predetermined current threshold, it is possible to avoid the use of a large amount of fuel gas for increasing the current value, and to suppress deterioration in fuel efficiency at the time of increasing the current of the fuel cell.

The present disclosure can be implemented in various aspects. For example, the present disclosure can be implemented in the aspects such as a vehicle mounted with a fuel cell system, an oxide layer removal method, a control method of a fuel cell system, a program for executing the control method, and a storage medium for storing the program.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

A1. System Configuration

Figure 1:
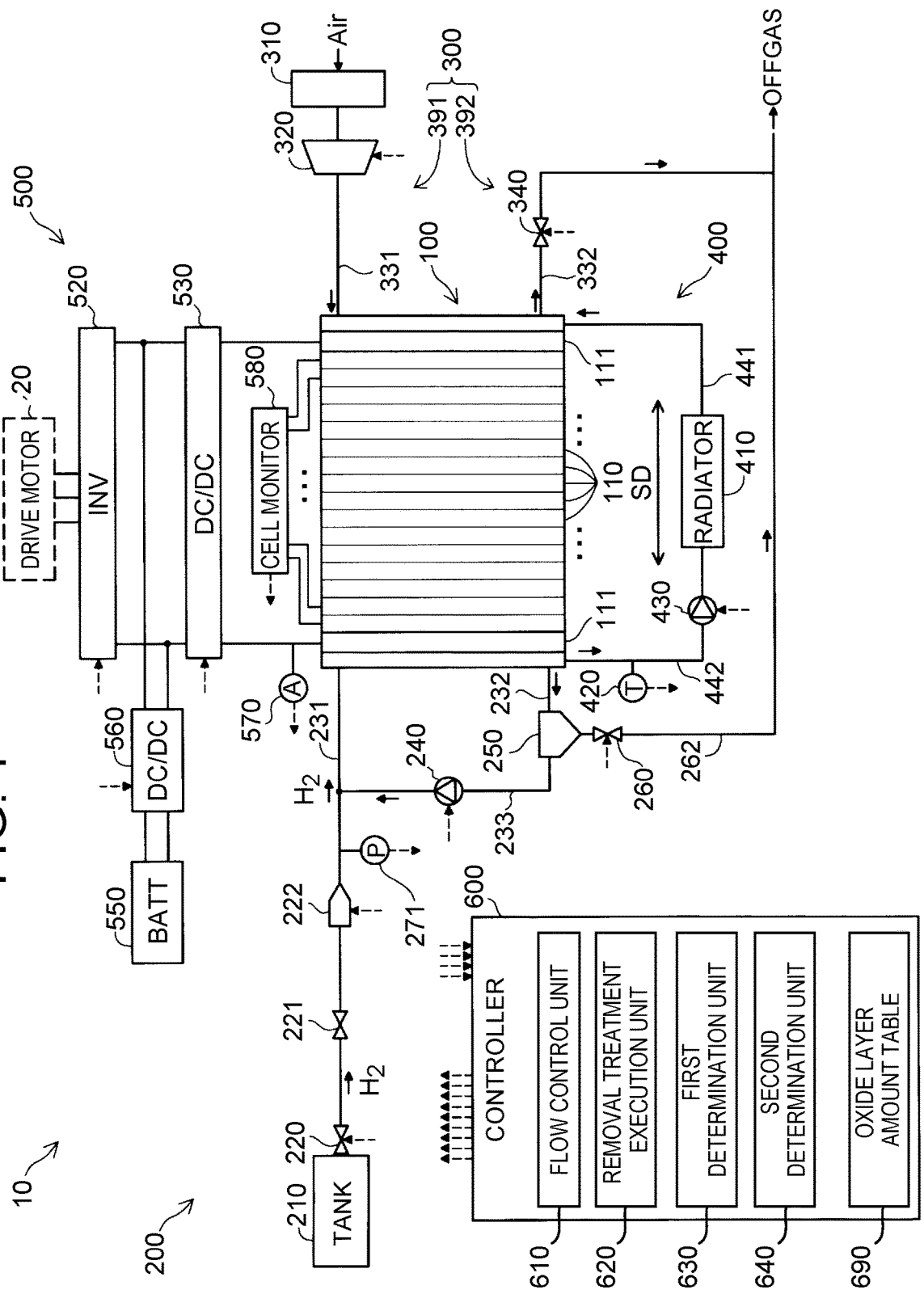
FIG. 1 is a sectional view showing the schematic configuration of a fuel cell system as one embodiment of the present disclosure.

FIG. 1 is a sectional view showing the schematic configuration of a fuel cell system 10 as one embodiment of the present disclosure. The fuel cell system 10 is mounted on a vehicle and used as a system that supplies electric power to a drive motor 20. The fuel cell system 10 includes a fuel cell 100, an anode-side gas supply discharge mechanism 200, a cathode-side gas supply discharge mechanism 300, a fuel cell circulation cooling mechanism 400, a power supply circuit 500, a secondary battery 550, and a controller 600.

The fuel cell 100 is a polymer electrolyte fuel cell having a cell stack that is made up of a plurality of unit cells 110 stacked along a stacking direction SD. The unit cells 110 each generate electric power through electrochemical reaction between fuel gas supplied to an anode-side catalytic electrode layer and oxidant gas supplied to a cathode-side catalytic electrode layer, with a solid polyelectrolyte membrane provided between the catalytic electrode layers. In the present embodiment, fuel gas is hydrogen gas and oxidant gas is air. The catalytic electrode layer is configured by containing a catalyst, such as carbon particles that carry platinum (Pt), and electrolyte. In the unit cells 110, a gas diffusion layer formed from a porous body is placed outside both the electrode-side catalytic electrode layers. As the porous body, a carbon porous body, such as carbon paper and a carbon cloth, and a metallic porous body, such as a metallic mesh, and foam metal, is used, for example. In the fuel cell 100, a manifold (illustration omitted) for passing fuel gas, oxidant gas, and a cooling medium is formed along the stacking direction SD. The fuel cell 100 includes a pair of electrode plates 111 that face both the ends of the cell stack. The pair of electrode plates 111 functions as comprehensive electrodes in the fuel cell 100.

The anode-side gas supply discharge mechanism 200 supplies fuel gas to the fuel cell 100, and discharges anode offgas from the fuel cell 100. The anode-side gas supply discharge mechanism 200 includes a tank 210, a shutoff valve 220, a pressure-regulating valve 221, an injector 222, a gas-liquid separator 250, a circulation pump 240, a purge valve 260, a fuel gas supply passage 231, a first anode offgas discharge passage 232, a gas circulation passage 233, a second anode offgas discharge passage 262, and a pressure sensor 271.

The tank 210 stores high pressure hydrogen and supplies hydrogen gas as fuel gas to the fuel cell 100 through the fuel gas supply passage 231. The shutoff valve 220 is placed in the vicinity of a fuel gas supply port in the tank 210 to switch between execution and stop of hydrogen gas supply from the tank 210. The pressure-regulating valve 221 is placed at a position that is on the downstream side of the shutoff valve 220 and on the upstream side of the injector 222 in the fuel gas supply passage 231. The pressure-regulating valve 221 regulates its own upstream-side pressure (primary pressure) to be its own preset downstream-side pressure (secondary pressure). The injector 222 is placed on the downstream side of the pressure-regulating valve 221 in the fuel gas supply passage 231 to inject fuel gas to the fuel cell 100. At this time, an amount and a pressure of the fuel gas supplied to the fuel cell 100 are regulated by regulating an injection period and an injection duty (a ratio of time of injecting hydrogen gas per injection period) of the fuel gas in the injector 222.

The gas-liquid separator 250 is placed in the first anode offgas discharge passage 232, to separate liquid contained in the anode offgas that is discharged from the fuel cell 100 and discharge the liquid to the second anode offgas discharge passage 262. The gas-liquid separator 250 also discharges the anode offgas to the gas circulation passage 233 after the liquid is separated. The gas-liquid separator 250 also stores the liquid separated from the anode offgas, and when a later-described purge valve 260 is opened, the gas-liquid separator 250 discharges the stored liquid to the second anode offgas discharge passage 262. Examples of the liquid contained in the anode offgas may include generated water generated through electrochemical reaction in each of the unit cells 110. The anode offgas after the liquid is separated may contain hydrogen gas not used in the electrochemical reaction in each of the unit cells 110 and nitrogen gas transmitted from the cathode side to the anode side through the solid polymer membrane in each of the unit cells 110.

The circulation pump 240 is placed in the gas circulation passage 233 to pump out the anode offgas that is discharged from the gas-liquid separator 250 to the fuel gas supply passage 231. The purge valve 260 is placed in the second anode offgas discharge passage 262, and when the purge valve 260 is opened, the purge valve 260 discharges the liquid separated by the gas-liquid separator 250 to the second anode offgas discharge passage 262. The gas-liquid separator 250 communicates with the fuel cell 100 through the first anode offgas discharge passage 232. When the purge valve 260 is opened, the gas-liquid separator 250 communicates with atmospheric air through the second anode offgas discharge passage 262. The pressure in the fuel cell 100 is higher than the atmospheric pressure. Accordingly, when the purge valve 260 is opened, the liquid accumulated in the gas-liquid separator 250 is discharged to the second anode offgas discharge passage 262 due to a pressure difference between the fuel cell 100 and the atmospheric air. In this case, the first anode offgas discharge passage 232 and the second anode offgas discharge passage 262 communicate with each other through the purge valve 260.

The fuel gas supply passage 231 communicates with an unshown manifold for fuel gas supply that is provided in the fuel cell 100. The fuel gas supply passage 231 receives the fuel gas supplied from the injector 222 and the anode offgas supplied from the circulation pump 240. The anode offgas supplied from the circulation pump 240 is mainly made of hydrogen gas discharged without being used in each of the unit cells 110. Fuel efficiency is enhanced by returning this hydrogen gas to the fuel gas supply passage 231. The first anode offgas discharge passage 232 communicates with an unshown manifold for anode offgas discharge that is provided in the fuel cell 100. The first anode offgas discharge passage 232 sends out the anode offgas, to be discharged from the manifold to the outside of the fuel cell 100, to the gas-liquid separator 250.

The cathode-side gas supply discharge mechanism 300 supplies oxidant gas to the fuel cell 100, and discharges cathode offgas from the fuel cell 100. The cathode-side gas supply discharge mechanism 300 includes an oxidant gas supply unit 391 and a cathode offgas discharge unit 392. The oxidant gas supply unit 391 supplies air as oxidant gas to the fuel cell 100. The oxidant gas supply unit 391 includes an air cleaner 310, an air compressor 320, and an oxidant gas supply passage 331. The air cleaner 310 removes foreign materials, such as dust in the air, with a filter provided therein, and supplies filtered air after removal of the foreign materials to the air compressor 320. The air compressor 320 compresses the air supplied from the air cleaner 310, and sends out the air to the oxidant gas supply passage 331. The oxidant gas supply passage 331 connects between the air compressor 320 and the fuel cell 100, and sends the air compressed by the air compressor 320 to the fuel cell 100. The cathode offgas discharge unit 392 includes a cathode offgas discharge passage 332 and a backpressure valve 340. The cathode offgas discharge passage 332 is connected to each of the fuel cell 100 and the aforementioned second anode offgas discharge passage 262, to send the cathode offgas discharged from the fuel cell 100 to the second anode offgas discharge passage 262. The backpressure valve 340 is provided in the cathode offgas discharge passage 332 to regulate the pressure of the cathode offgas on the discharge side in the fuel cell 100. The cathode offgas discharge passage 332 is connected with the aforementioned second anode offgas discharge passage 262. The liquid and cathode offgas discharged through the cathode offgas discharge passage 332 are discharged to the atmospheric air together with the liquid and anode offgas that are discharged through the second anode offgas discharge passage 262.

The fuel cell circulation cooling mechanism 400 regulates the temperature of the fuel cell 100 by circulating a cooling medium through the fuel cell 100. The fuel cell circulation cooling mechanism 400 includes a radiator 410, a cooling medium discharge passage 442, a cooling medium supply passage 441, and a circulation pump 430. The radiator 410 is connected to the cooling medium discharge passage 442 and the cooling medium supply passage 441. The radiator 410 cools the cooling medium flowing from the cooling medium discharge passage 442 with air sent from an unshown electric fan, or the like, and then discharges the cooling medium to the cooling medium supply passage 441. The cooling medium discharge passage 442 is connected with an unshown manifold for cooling medium discharge provided in the fuel cell 100. The cooling medium supply passage 441 is connected to an unshown manifold for cooling medium supply provided in the fuel cell 100. Therefore, the cooling medium discharge passage 442, the radiator 410, the cooling medium supply passage 441, and the manifold in the fuel cell 100 form a circulation path of the cooling medium. In the present embodiment, water is used as the cooling medium. Any heat-exchangeable media other than water, including unfreezable water such as ethylene glycol, and air, may be used as the cooling medium. The circulation pump 430 is placed in the cooling medium discharge passage 442 to pump out the cooling medium discharged from the fuel cell 100 to the radiator 410.

The power supply circuit 500 supplies electric power to the drive motor 20 from at least one of the fuel cell 100 and the secondary battery 550. The power supply circuit 500 regulates the current of the fuel cell 100 (hereinafter, referred to as "FC current"). The power supply circuit 500 controls charging of the secondary battery 550. The power supply circuit 500 includes a fuel cell control converter 530, an inverter 520, a secondary battery control converter 560, a current measurement unit 570, and a cell monitor 580.

The fuel cell control converter 530 is a DC-DC converter that boosts an output voltage of the fuel cell 100. The fuel cell control converter 530 regulates the FC current by regulating a switching frequency of an incorporated switching element in response to a command from the controller 600. The secondary battery control converter 560 is a DC-DC converter that boosts the output voltage of the secondary battery 550. The secondary battery control converter 560 also steps down at least one of regenerative electric power of the drive motor 20 and output electric power of the fuel cell 100, and supplies the stepped-down electric power to the secondary battery 550. The inverter 520 is electrically connected to both the fuel cell 100 and the secondary battery 550 to convert direct current voltages output from the fuel cell 100 and the secondary battery 550 into alternating voltages. The converted alternating voltages are supplied to the drive motor 20. The inverter 520 also converts an alternating voltage of the regenerative electric power output from the drive motor 20 into a direct current voltage, and outputs the direct current to the secondary battery control converter 560. The current measurement unit 570 is placed in a line connecting the electrode plates 111 of the fuel cell 100 and the fuel cell control converter 530, to measure the FC current. The cell monitor 580 measures the voltages of each of the unit cells 110. In the controller 600, voltage values of each of the unit cells 110 measured by the cell monitor 580 are time-serially recorded as a history.

The secondary battery 550, which is constituted of a lithium ion battery, functions, together with the fuel cell 100, as an electric power supply source in the fuel cell system 10. The secondary battery 550 may be constituted of a battery of any other types, such as a nickel-hydrogen battery, instead of the lithium ion battery.

The controller 600 controls the entire fuel cell system 10. The controller 600 is constituted of an electronic control unit (ECU) that is made of a microcomputer including a central processing unit (CPU) and a storage device. The controller 600 includes a flow control unit 610, a removal treatment execution unit 620, a first determination unit 630, and a second determination unit 640. The flow control unit 610, the removal treatment execution unit 620, the first determination unit 630, and the second determination unit 640 are each configured as a functional unit that functions when an unshown CPU included in the controller 600 executes control programs prestored in the storage device.

The flow control unit 610 controls the flow rate of air supplied to the fuel cell 100. Specifically, the flow rate of air supplied to the fuel cell 100 is controlled by regulating the speed of the air compressor 320. The flow rate of air supplied to the fuel cell 100 may be controlled by regulating, in place of the speed of the air compressor 320, or in addition to the speed of the air compressor 320, the opening degree of an unshown valve provided in one of the oxidant gas supply passage 331 and the cathode offgas discharge passage 332.

The removal treatment execution unit 620 executes an oxide layer removal treatment that removes an oxide layer generated on a catalyst used in the cathode of each of the unit cells 110. The removal treatment execution unit 620 executes the oxide layer removal treatment by adjusting the voltage of the fuel cell 100 to be within a predetermined second voltage range R2 described later. The second voltage range is sufficiently lower than an open-circuit voltage (OCV) of the fuel cell 100 and is lower than a later-described first voltage range R1. The method for adjusting the voltage of the fuel cell 100 to be in the second voltage range R2 and the details of the first voltage range R1 will be described later.

The first determination unit 630 determines whether or not a first condition, indicating the state where the amount of an oxide layer generated on the catalyst of the cathode is equal to or more than a predetermined first amount, is satisfied. The second determination unit 640 determines whether or not a second condition, indicating the state where the amount of an oxide layer generated on the catalyst of the cathode is equal to or more than a predetermined second amount, is satisfied. The first amount, the second amount, the first condition, and the second condition will be described in detail later. The controller 600 has an unshown storage device that stores an oxide layer amount table 690 in advance. The oxide layer amount table 690 is referred in the case of determining whether the first condition and the second condition are satisfied.

Figure 2:
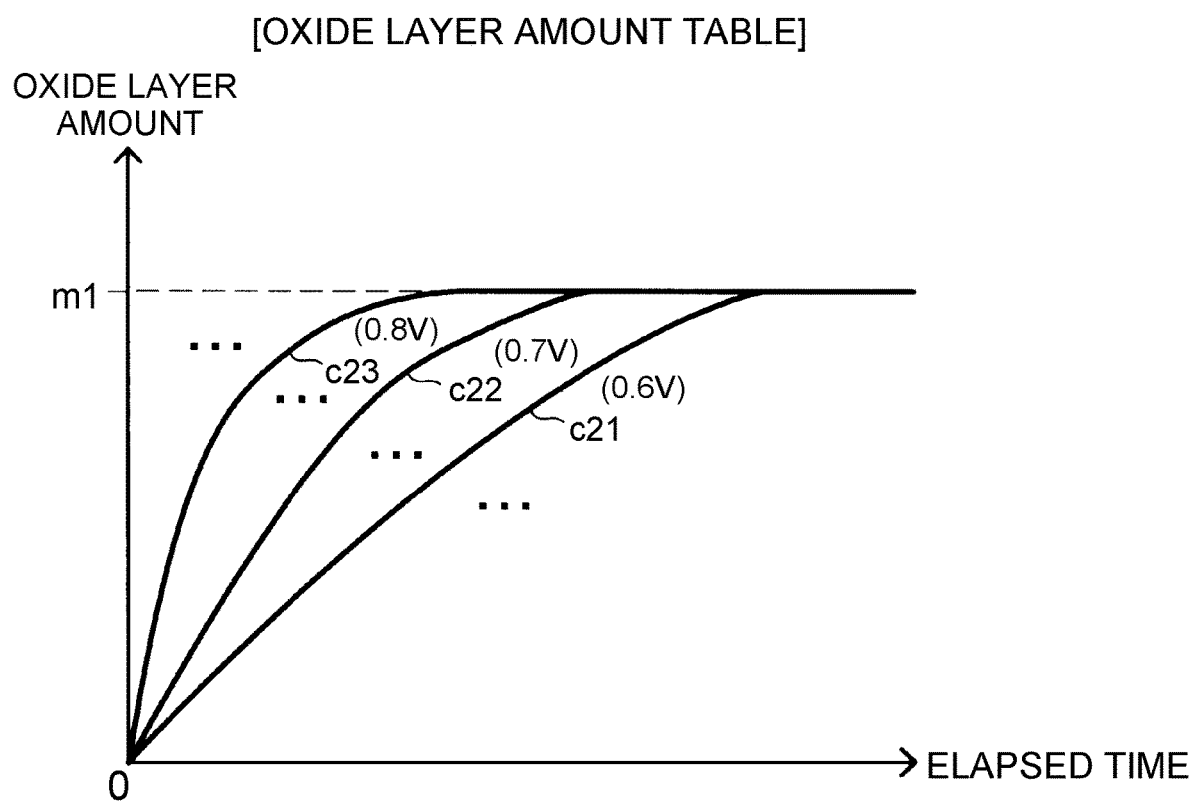
FIG. 2 is an explanatory view schematically showing setting contents of an oxide layer amount table.

FIG. 2 is an explanatory view schematically showing setting contents of the oxide layer amount table 690. In the oxide layer amount table 690, elapsed time from execution of the later-described oxide layer removal treatment and the amount of an oxide layer generated on a cathode catalyst in each of the unit cells 110 are set in association with each other for every voltage (hereinafter, referred to as "cell voltage") of the unit cells 110. In FIG. 2, a set value c21 in the case of a cell voltage of 0.6 V, a set value c22 in the case of a cell voltage of 0.7 V, and a set value c23 in the case of a cell voltage of 0.8 V are shown as representative values. Since the catalyst amount used for each of the unit cells 110 is fixed, the oxide layer amount has an upper limit of ml. As shown in FIG. 2, as the cell voltages are higher, the oxide layer amount becomes larger even with the same elapsed time. Hence, the elapsed time till the oxide layer amount reaches the upper limit ml is shorter as the cell voltages are higher. Such a relationship between the elapsed time and the oxide layer amount is obtained by an experiment, with the cell voltages being varied, and is preset in the oxide layer amount table 690.

In the fuel cell system 10 having the above configuration, the first operation and the second operation are set as an operation mode. The second operation is also called a normal operation, which means that the operation is performed in the state where the value of the FC current is larger than zero and the flow rate of oxidant gas is controlled in response to an output request to the fuel cell 100. The first operation is also called an intermittent operation, which means that the operation is performed in the state where the value of the FC current is zero and the flow rate of oxidant gas is controlled such that the voltage of the fuel cell 100 is maintained within a predetermined first voltage range that is lower than the open-circuit voltage of the fuel cell 100. The first operation is executed when request electric power to the fuel cell system 10 is very low. When the request electric power is very low, the fuel cell system 10 supplies electric power from the secondary battery 550 and stops electric power output from fuel cell 100, in order to suppress a decrease in energy efficiency of the entire system. However, in this case, hydrogen gas and air as oxidant gas remain in the fuel cell 100. As a consequence, a cathode potential becomes excessively high, so that an oxide layer is easily generated. Meanwhile, residual hydrogen gas on the anode side permeates to the cathode side through the electrolyte membrane and is oxidized in each of the unit cells 110. Such oxidization causes consumption of the residual air on the cathode side, so that the cathode potential falls. Due to the fall of the cathode potential, the oxide layer is reduced and removed. However, the cathode catalyst reduced in this way easily dissolves when the cathode potential rises again afterward. Accordingly, the first operation is executed such that the voltage of the fuel cell 100 is maintained within the first voltage range that is lower than the open-circuit voltage. If the voltage of the fuel cell 100 is within the first voltage range, an excessive increase in cathode potential can be suppressed, and generation of the oxide layer can be suppressed. The dissolution of the catalyst attributed to the cathode potential being in a low state can also be suppressed. The first voltage range may be set to any voltage range that is lower than the open-circuit voltage. For example, when the open-circuit voltage is 1.0 V, the first voltage range may be set to the range of 0.7 V or more and 0.8 V or less.

Generation of an oxide layer can occur in the above second operation, and can still occur when the first operation is performed. Accordingly, a catalyst refreshing treatment described later is executed in the fuel cell system 10. The catalyst refreshing treatment involves execution of a treatment (later-described oxide layer removal treatment) in which an oxide layer is reduced and removed by temporarily adjusting the voltage of the fuel cell 100 to a very low voltage. Here, in the catalyst refreshing treatment of the present embodiment, the voltage of the fuel cell 100 is lowered, though dissolution of the catalyst at the time when the voltage rises again afterward can be suppressed. The catalyst refreshing treatment of the present embodiment makes it possible to shorten the time until the voltage of the fuel cell 100 returns to a target voltage after the voltage is adjusted to be a low voltage, and the voltage return response can be enhanced.

A2. Catalyst Refreshing Treatment

Figure 3:
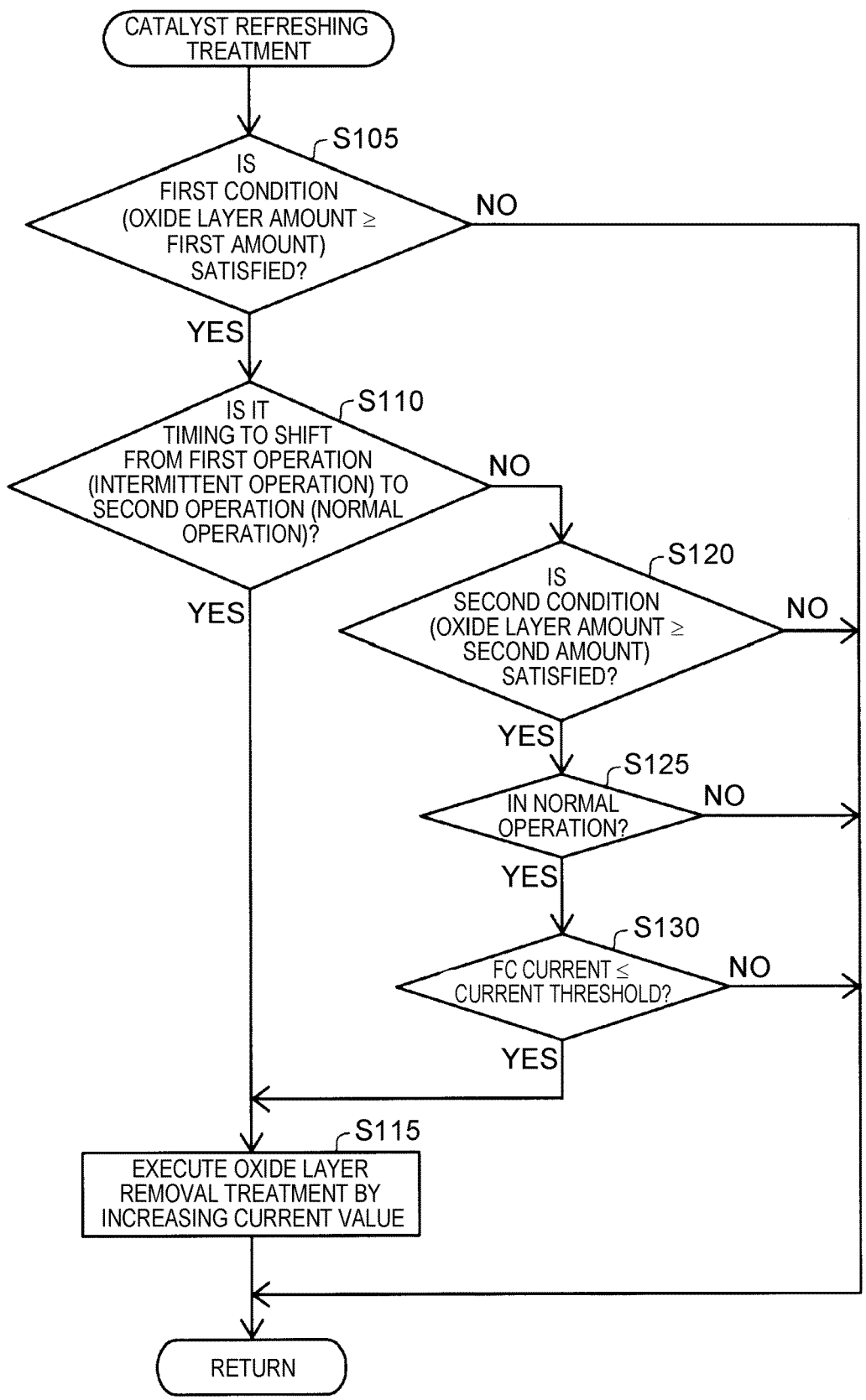
FIG. 3 is a flow chart showing the procedures of a catalyst refreshing treatment.

FIG. 3 is a flow chart showing the procedures of the catalyst refreshing treatment. When a starting switch of a vehicle is turned on, and the fuel cell system 10 is started up, the catalyst refreshing treatment is executed.

The first determination unit 630 determines whether or not the first condition is satisfied (step S105). In the present embodiment, the first condition represents a condition that "the amount of an oxide layer generated on the catalyst of the cathode in each of the unit cells 110 is equal to or more than a first amount." The amount of an oxide layer generated on the catalyst of the cathode in each of the unit cells 110 is obtained with reference to the oxide layer amount table 690 based on the history of voltage of each of the unit cells 110 recorded on the controller 600. Specifically, when a period of time corresponding to a certain voltage value is found out based on the history of voltage, an oxide layer amount can be identified from the oxide layer amount table 690 based on the period of time. By integrating the thus-identified oxide layer amount, the oxide layer amount generated on the catalyst of the cathode in each of the unit cells 110 at the time when step S105 is executed can be obtained.

Figure 4:
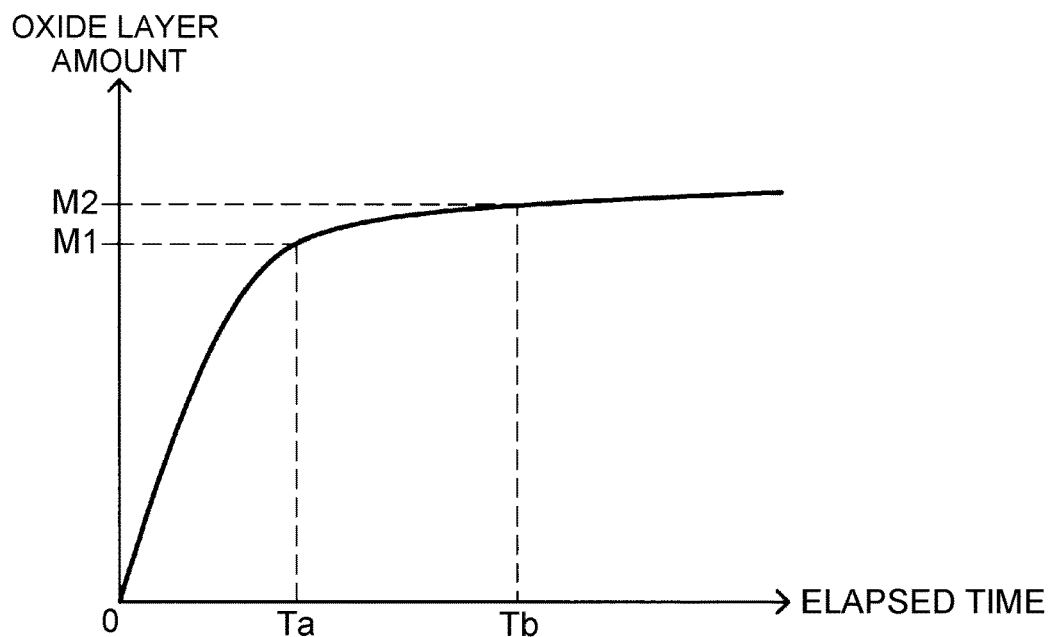
FIG. 4 is an explanatory view schematically showing lapsed time from a previous catalyst refreshing treatment and the amount of an oxide layer generated on the catalyst of each unit cell.

FIG. 4 is an explanatory view schematically showing lapsed time from a previous catalyst refreshing treatment and the amount of an oxide layer generated on the catalyst of each of the unit cells 110. In FIG. 4, a horizontal axis represents the elapsed time from execution of the previous oxide layer removal treatment, and a vertical axis represents the oxide layer amount.

As shown in FIG. 4, the oxide layer amount increases with the elapse of time. An increase speed of the oxide layer amount is very high up to the lapsed time of time Ta. Once the lapsed time exceeds time Tad, the increase speed of the oxide layer amount is slowed. Such an increase tendency of the oxide layer amount is obtained by an experiment in advance, and an oxide layer amount M1 at time Ta is set as a first amount in step S105. An oxide layer amount M2 at time Tb is set as a later-described second amount.

As shown in FIG. 3, when the first determination unit 630 determines that the first condition is not satisfied (step S105: NO), the process returns to step S105. Contrary to this, when the first determination unit 630 determines that the first condition is satisfied (step S105: YES), the controller 600 determines whether or not it is timing to shift from the first operation to the second operation (step S110). That is, in step S110, the controller 600 determines whether or not it is timing to shift from intermittent operation to normal operation.

When the controller 600 determines that it is timing to shift from the first operation to the second operation (step S110: YES), the removal treatment execution unit 620 executes an oxide layer removal treatment by increasing the FC current in a predetermined period (step S115). In step S115, the removal treatment execution unit 620 increases the FC current so as to adjust the voltage of the fuel cell 100 to be within a predetermined second voltage range R2 that is lower than the aforementioned first voltage range. Thus, the cathode potential is lowered, and the oxide layer is removed. After execution of step S115, the process returns to step S105

Figure 5:
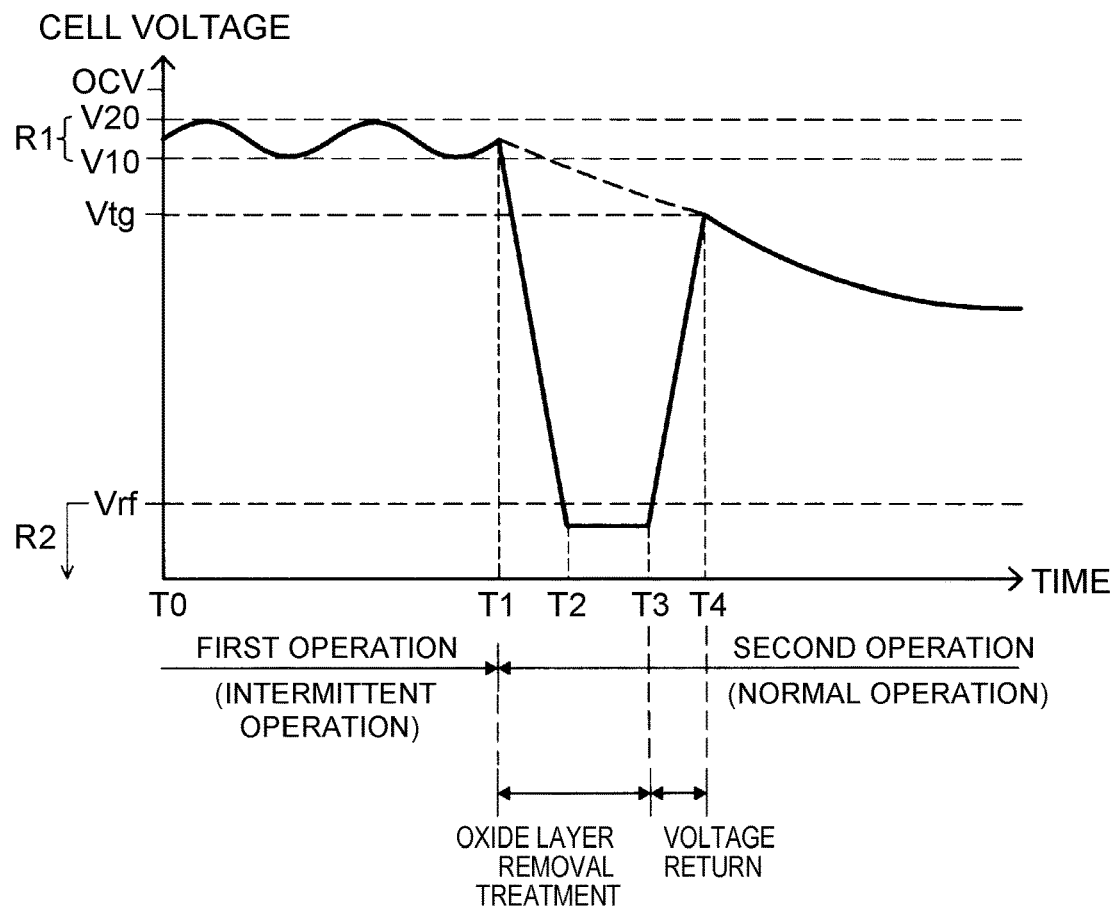
FIG. 5 is an explanatory view showing a change in cell voltage before and after execution of an oxide layer removal treatment.

FIG. 5 is an explanatory view showing a change in cell voltage before and after execution of the oxide layer removal. In FIG. 5, a horizontal axis represents time and a vertical axis represents a cell voltage. In time T0 to T1, the first operation (intermittent operation) is executed, and after time T1, the second operation (normal operation) is executed. In the first operation, the cell voltage is maintained to be within a first voltage range R1. The first voltage range R1 has an upper limit voltage V20 that is lower than OCV. The first voltage range R1 also has a lower limit voltage V10 that is high enough to prevent reduction of the catalyst. In the first operation, the cell voltage fluctuates. This is because a reduction reaction of residual hydrogen that penetrates the electrolyte membrane consumes air of the cathode, and causes a drop of the cell voltage. When the cell voltage drops to the lower limit voltage V10, the cell voltage rises again as the flow control unit 610 increases the flow rate of air.

When operation of the fuel cell system 10 shifts from the first operation to the second operation at time T1, step S115 is executed. As a result, the cell voltage rapidly decreases to be within a second voltage range R2 at time T2. The second voltage range R2 is a range equal to or less than a voltage Vrf. The voltage Vrf is an upper limit voltage that may cause reduction of the catalyst layer. The second voltage range R2 is a voltage range lower than the aforementioned first voltage range R1. In other words, the voltage Vrf that is the upper limit voltage of the second voltage range R2 is lower than the lower limit voltage V10 of the first voltage range R1. The reason why the cell voltage rapidly decreases due to the increase in the FC current in step S115 as shown in FIG. 5 will be described with reference to FIG. 6.

Figure 6:
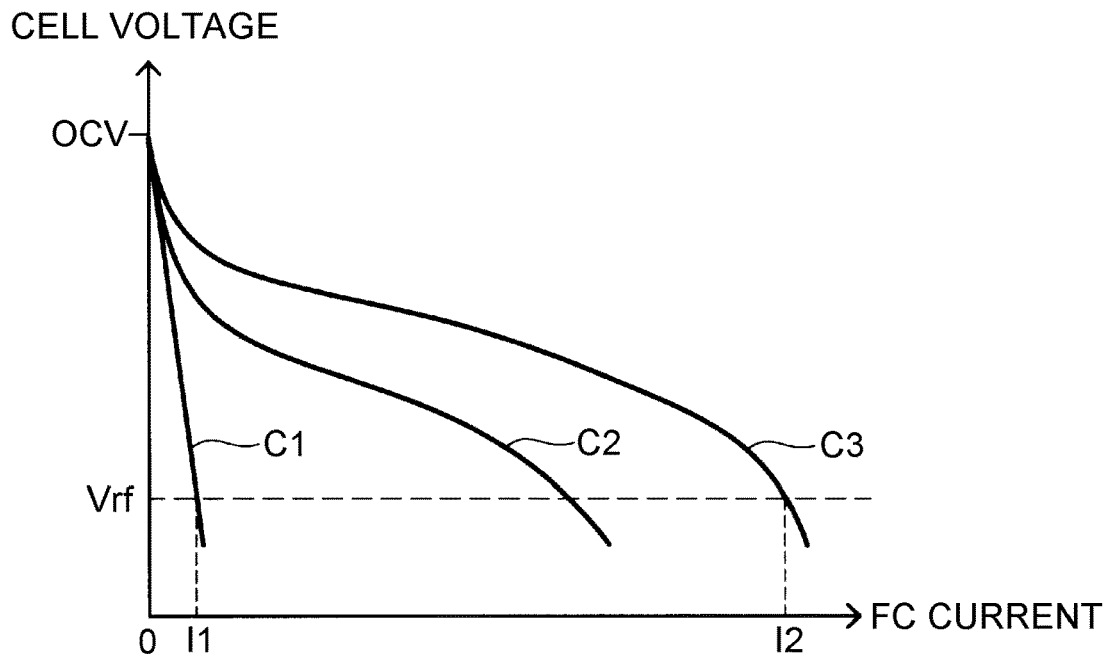
FIG. 6 is an explanatory view showing a relationship between IV characteristics of a fuel cell and the flow rate of air supplied to the fuel cell.

FIG. 6 is an explanatory view showing a relationship between IV characteristics of the fuel cell 100 and the flow rate of air supplied to the fuel cell 100. In FIG. 6, a horizontal axis represents an FC current and a vertical axis represents a cell voltage. FIG. 6 shows IV characteristics (current-voltage characteristics) of the fuel cell 100 in the case of three different air flow rates. In FIG. 6, characteristics C1 represent IV characteristics when the flow rate of air is the smallest. Characteristics C2 represent IV characteristics when the flow rate of air is the second smallest. Characteristics C3 represent IV characteristics when the flow rate of air is the largest.

As shown in FIG. 6, in all the characteristics C1 to C2, the cell voltage drops as the FC current increases. As the flow rate of air supplied to the fuel cell 100 is smaller, the cell voltage in the case of the same FC current becomes lower. As the flow rate of air is smaller, the degree of drop of the cell voltage with respect to current increase becomes larger.

Under these circumstances, assume the case where, for example, the cell voltage drops from OCV where the FC current is zero to a voltage Vrf where the aforementioned reduction reaction of an oxide layer occurs. In this case, in the characteristics C3, the FC current needs to be increased to a very large current value I2, whereas in the characteristics C1, the FC current may be increased to a current value I1 that is much smaller than the current value I2. The characteristics C1 correspond to the IV characteristics of the first operation. Therefore, when the FC current increases in step S115, the cell voltage decreases rapidly. The increase in the FC current may be implemented by controlling the fuel cell control converter 530, and in an extremely short time as described above. Therefore, time T1 to T2 shown in FIG. 5 is extremely short. Thus, since time T1 to T2 is short, the amount of removal of the oxide layer until the cell voltage becomes equal to or less than the voltage Vrf can be suppressed.

As shown in FIG. 5, during a period from time T2 to time T3 at which the oxide layer removal treatment is ended, the cell voltage is within the second voltage range R2. Once the oxide layer removal treatment is ended, the system is in the second operation, that is, in normal operation. Hence, air is supplied to the fuel cell 100 in response to an output request. Because of this, the target voltage Vtg of the cell voltage takes a value lower than the first voltage range R1. As shown in FIG. 5, after time T3, the cell voltage rises toward the target voltage Vtg, and at time T4, the cell voltage reaches the target voltage Vtg. In the catalyst refreshing treatment of the present embodiment, a period of time until the cell voltage returns to the target voltage Vtg after the oxide layer removal treatment is ended, that is, a period of time from time T3 to T4, is short. This is because the operation of the fuel cell system 10 is the second operation (normal operation), so that the flow rate of air supplied to the fuel cell 100 is extremely larger and the increase speed of the cell voltage is extremely higher than those during the first operation.

As described above, since time T3 to T4 is short, a period of time when the cell voltage stays within the second voltage range R2 is short. Then, dissolution of the catalyst after the cell voltage is returned is suppressed.

Figure 7:
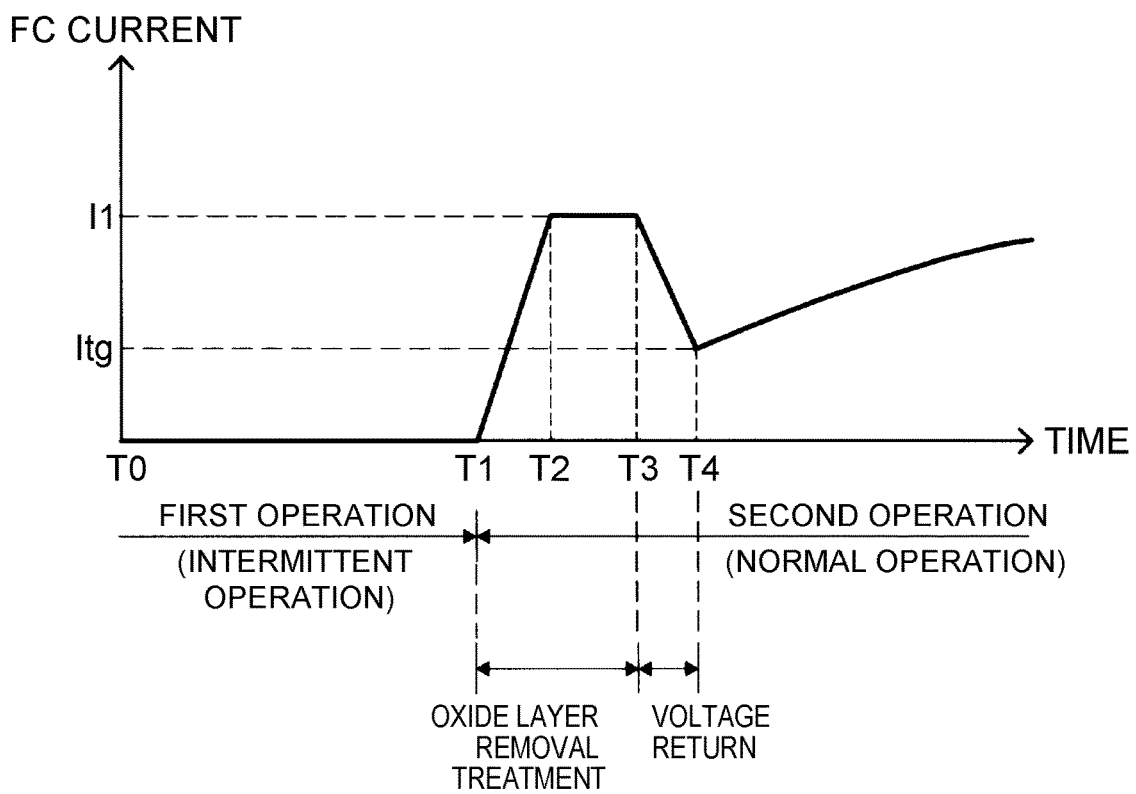
FIG. 7 is an explanatory view showing a change in FC current before and after execution of the catalyst refreshing treatment.

FIG. 7 is an explanatory view showing a change in FC current before and after execution of the catalyst refreshing treatment. As in FIG. 5, the first operation (intermittent operation) is executed at time T0 to T1, and after time T1, the second operation (normal operation) is executed. During the first operation, the FC current is zero. At time T1 when the operation shifts from the first operation to the second operation, the FC current rises to the current value I1, and then the current value I1 is maintained till time T3. When the oxide layer removal treatment is ended at time T3, the FC current decreases, and reaches a target current value Itg at time T4.

As shown in FIG. 3, when the first determination unit 630 determines that the first condition is not satisfied in step S110 (step S110: NO), the second determination unit 640 determines whether or not a second condition is satisfied (step S120). In the present embodiment, the second condition represents a condition that "the amount of an oxide layer generated on the catalyst of the cathode in each of the unit cells 110 is equal to or more than the second amount." Since how to obtain the amount of an oxide layer generated on the catalyst of the cathode in each of the unit cells 110 is the same as in step S105, the description thereof is omitted. The second amount is an oxide layer amount M2 when the elapsed time from the previous oxide layer removal treatment is time Tb shown in FIG. 4. The oxide layer amount M2 is larger than the aforementioned oxide layer amount M1. The oxide layer amount M2 is preset in consideration of the level of deterioration in the electric power generation efficiency due to the increase in the oxide layer amount. For example, the oxide layer amount when the electric power generation efficiency is an allowable lower limit may be obtained by an experiment, and the obtained oxide layer amount may be set as the oxide layer amount M2. When the second determination unit 640 determines that the first condition is not satisfied (step S120: NO), the process returns to step S105.

Meanwhile, when the second determination unit 640 determines that the second condition is satisfied (step S120: YES), the controller 600 determines whether or not the fuel cell system 10 is in normal operation (step S125). When the controller 600 determines that the fuel cell system 10 is not in normal operation (step S125: NO), the process returns to aforementioned step S105. On the contrary, when determining that the fuel cell system 10 is in normal operation (step S125: YES), the controller 600 determines whether or not the FC current is equal to or less than a threshold current value (step S130).

When it is determined that the FC current is not equal to nor less than the threshold current value (step S130: NO), the process returns to step S105. Contrary to this, when the controller 600 determines that the FC current is equal to or less than the threshold current value (step S130: YES), step S115 is executed. That is, the removal treatment execution unit 620 executes the oxide layer removal treatment.

Thus, in the case where shift from the first operation to the second operation is executed, the fuel cell system 10 performs the oxide layer removal treatment at the time of the shift until the oxide layer amount exceeds the oxide layer amount M1. In the case where the oxide layer amount exceeds the oxide layer amount M1 and reaches the oxide layer amount M2, and the FC current is equal to or less than the threshold current value, the fuel cell system 10 executes the oxide layer removal treatment even though the shift from the first operation to the second operation is not executed. The reason why the oxide layer removal treatment is executed in the case where the oxide layer amount exceeds the oxide layer amount M1 and reaches the oxide layer amount M2 even though the shift from the first operation to the second operation is not executed is to suppress considerable deterioration in the electric power generation efficiency due to a large oxide layer amount. The reason why the oxide layer removal treatment is executed at this time when the FC current is equal to or less than the threshold current value is as shown below. As described above, the oxide layer removal treatment of step S115 is executed by increasing the FC current. Accordingly, if it is attempted to execute the oxide layer removal treatment while the FC current value is high, the FC current needs to be increased to a very high value. In that case, to increase the FC current, a large amount of hydrogen gas is consumed, and the fuel efficiency is decreased. Accordingly, when the FC current is equal to or less than the threshold current value, the fuel cell system 10 executes the oxide layer removal treatment to suppress deterioration in fuel efficiency.

A3. Comparative Example

Figure 8:
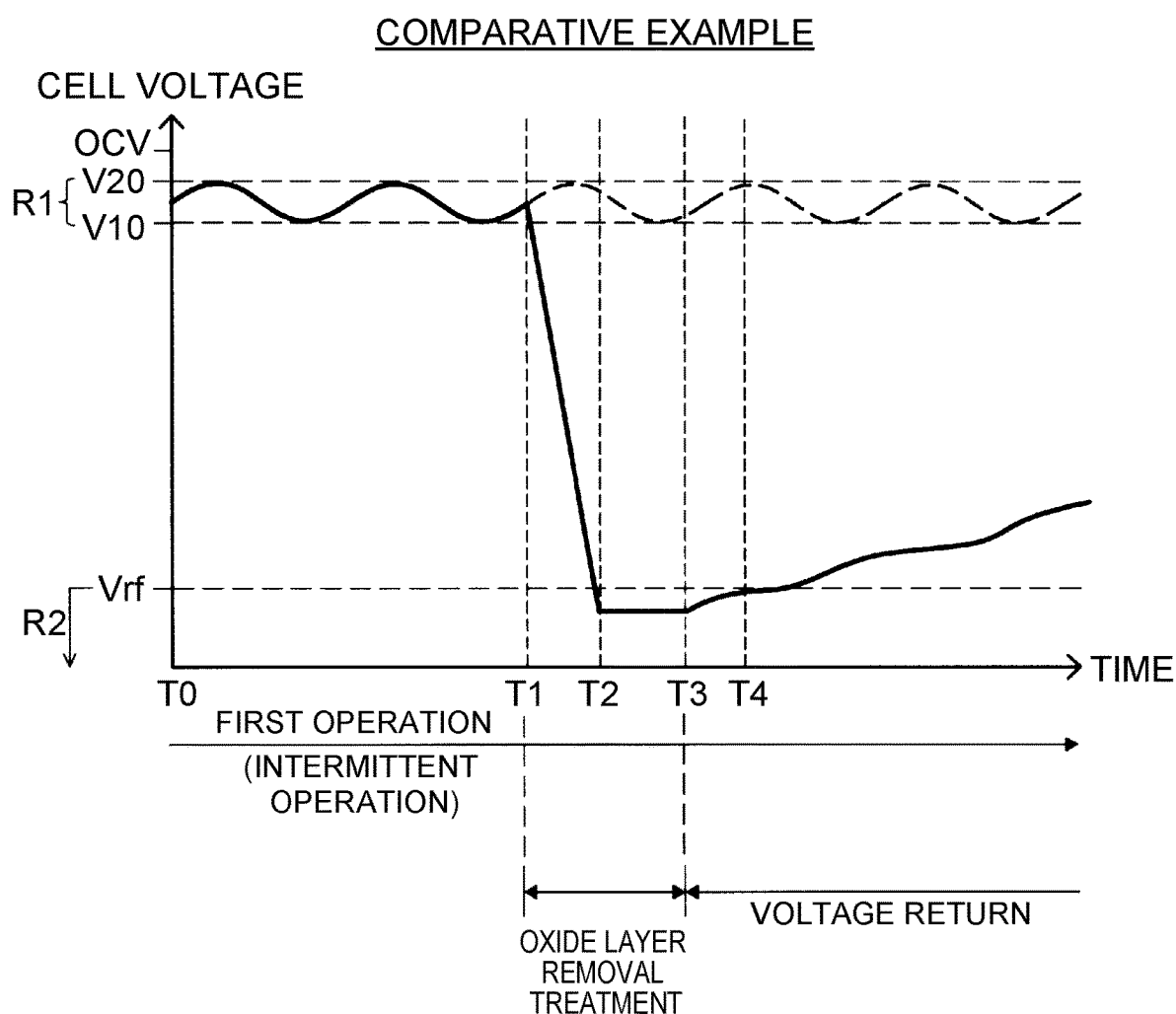
FIG. 8 is an explanatory view showing a change in cell voltage before and after execution of the catalyst refreshing treatment in a comparative example.

FIG. 8 is an explanatory view showing a change in cell voltage before and after execution of the catalyst refreshing treatment in a comparative example. A horizontal axis and a vertical axis in FIG. 8 are the same as the horizontal axis and vertical axis in FIG. 5. In the comparative example, the oxide layer removal treatment is executed during execution of the first operation. In this configuration, as in the example shown in FIG. 5, the current is increased at time T1, and the cell voltage rapidly decreases to a value within the second voltage range R2. The cell voltage is maintained within the second voltage range R2 till time T3. After time T3, the cell voltage is increased to adjust the cell voltage to be within the first voltage range R1. However, in this case, the first operation (intermittent operation) is in execution in the fuel cell system 10, which hinders a rapid increase in air. Instead, the cell voltage is gradually increased through repetition of gradual increase and decrease. Hence, it takes an extremely long time for the cell voltage to rise to a target voltage, that is, a voltage within the first voltage range R1. That is, the voltage return response is low. Therefore, in the comparative example, a period of time when the cell voltage stays in relatively low voltages in the vicinity of the second voltage range R2 is prolonged, which ends up promoting the outflow of the catalyst after the cell voltage returns to the first voltage range R1.

On the contrary, the fuel cell system 10 of the aforementioned first embodiment has a high voltage return response. In other words, a period of time until the cell voltage returns to the target voltage Vtg after execution of the oxide layer removal treatment execution is short. As a result, a period of the time when the cell voltage stays in relatively low voltages in the vicinity of the second voltage range R2 is short, so that the outflow of the catalyst when the cell voltage increases afterword can be suppressed. After time T3, it is not necessary to perform special control for rapidly increasing the flow rate of air supplied to the fuel cell 100. This makes it possible to suppress an increase in processing load of the controller 600 and to suppress manufacturing costs of the fuel cell system 10 without the necessity of a storage region for storing a program for such special control.

According to the fuel cell system of first embodiment described in the foregoing, the oxide layer removal treatment (step S115) is executed when the operation of the fuel cell system 10 shifts from the first operation to the second operation. Hence, the time taken for the cell voltage to reach a target voltage after the oxide layer removal treatment is ended can be shortened as compared with the configuration of the comparative example in which the oxide layer removal treatment is executed during execution of the first operation. Therefore, the oxide layer on the catalyst can be removed, and dissolution of the catalyst can be suppressed. Since the flow rate of air that is oxidant gas increases when the first operation shifts to the second operation, the voltage of the fuel cell 100 tends to rise. A target voltage in the second operation is generally lower than the first voltage range. Because of these reasons, the time taken to reach the target voltage Vtg after the end of the oxide layer removal treatment can be shortened. When the first operation shifts to the second operation, the current value is very small. Hence, as compared with the configuration where the oxide layer removal treatment is performed during the second operation (during normal operation), the amount of the fuel gas required to adjust the voltage of the fuel cell to be within the second voltage range can be suppressed, and thereby deterioration in fuel efficiency can be suppressed.

Moreover, the oxide layer removal treatment is executed when the first condition, indicating the state where the amount of an oxide layer generated on the catalyst is equal to or more than the predetermined first amount, is satisfied. Hence, the number of times that the process is executed can be reduced as compared with the configuration where the process is executed when the amount of the oxide layer is less that the first amount. This makes it possible to further suppress dissolution of the catalyst attributed to a drop of the cell voltage when the oxide layer removal treatment is executed Since the oxide layer removal treatment can be executed even in the case where the first condition is satisfied but the shift from the first operation (intermittent operation) to the second operation (normal operation) is not executed. Accordingly, a considerable increase in the amount of the oxide layer can be suppressed as compared with the configuration where the oxide layer removal treatment is not executed at all when the shift from the intermittent operation to the normal operation is not executed even though the first condition is satisfied. Moreover, since the oxide layer removal treatment is executed when the FC current is equal to or less than a current threshold, it is possible to avoid the use of a large amount of hydrogen gas for increasing the current value, and to thereby suppress deterioration in fuel efficiency at the time of increasing the FC current.

Moreover, the oxide layer removal treatment is executed by adjusting the cell voltage to be within the second voltage range R2 by increasing the FC current. Hence, the time taken to adjust the cell voltage to be within the second voltage range R2 can be shortened as compared with the configuration where the voltage of the fuel cell is adjusted to be within the second voltage range by reducing the flow rate of oxidant gas. Therefore, a considerable increase in the amount of removal of the oxide layer generated on the catalyst can be suppressed.

B. Second Embodiment

Since the device configuration of the fuel cell system 10 of a second embodiment is the same as that of the fuel cell system 10 of the first embodiment, the same component members are designated by the same reference numerals to omit the detailed description thereof. The fuel cell system 10 of the second embodiment is different from the fuel cell system 10 of the first embodiment in the procedures of the catalyst refreshing treatment.

Figure 9:
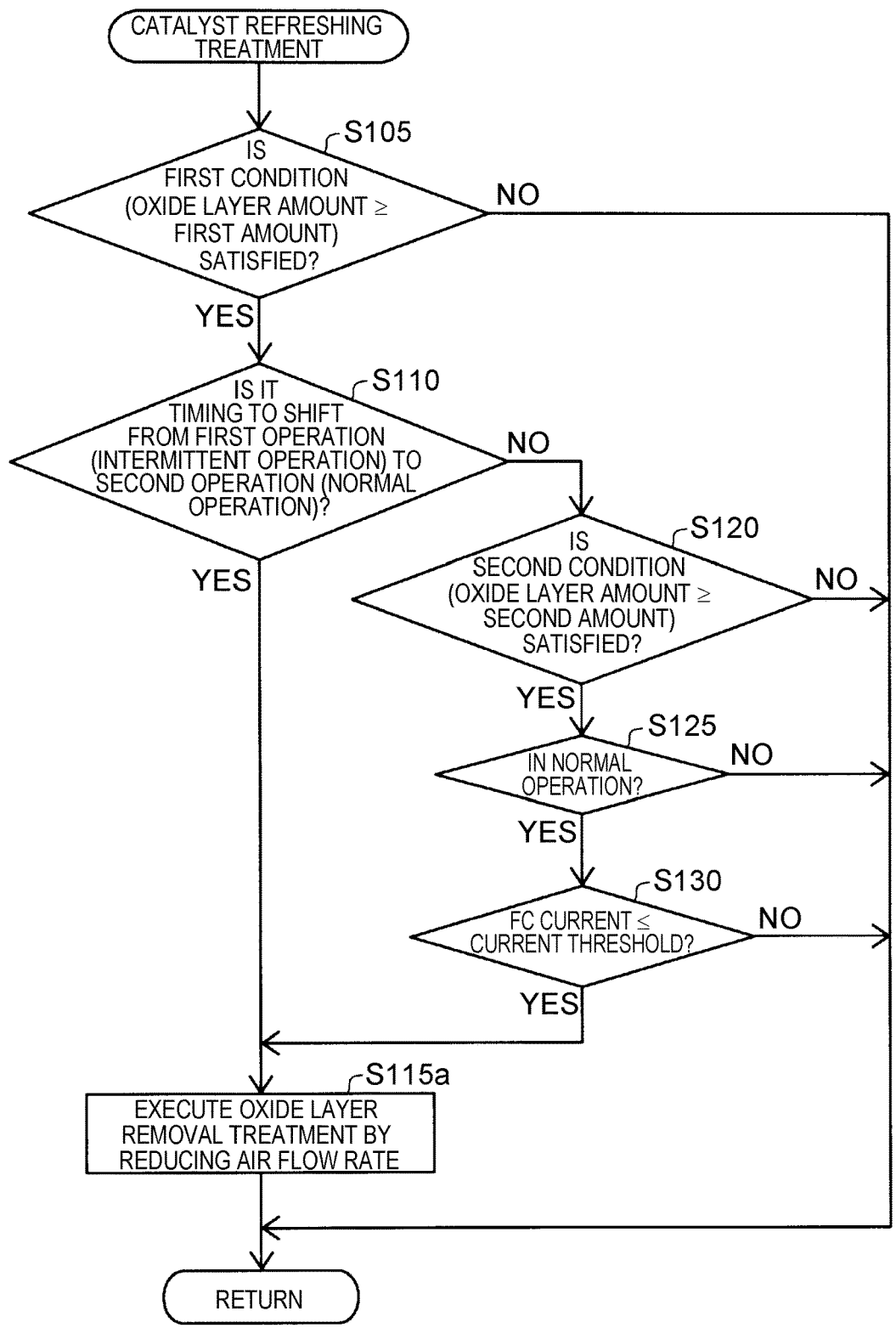
FIG. 9 is a flow chart showing the procedures of the catalyst refreshing treatment in a second embodiment.

FIG. 9 is a flow chart showing the procedures of the catalyst refreshing treatment in the second embodiment. The catalyst refreshing treatment of the second embodiment is similar in the procedures to the catalyst refreshing treatment of the first embodiment except that step S115a is executed in place of step S115.

When the controller 600 determines in step S110 that it is timing to shift from the first operation to the second operation (step S110: YES), or when the controller 600 determines in step S130 that the FC current is equal to or less than a current threshold (step S130: YES), the removal treatment execution unit 620 executes the oxide layer removal treatment by controlling the flow control unit 610 to reduce the flow rate of air supplied to the fuel cell 100 (step S115a).

When the flow rate of air is decreased, the FC current value is maintained, and the cell voltage drops. Accordingly, when the flow rate of air is decreased to adjust the cell voltage to be within the second voltage range R2, the oxide layer generated on the catalyst can be removed.

Also in the fuel cell system 10 of the second embodiment described above, the removal treatment execution unit 620 executes the oxide layer removal treatment (step S115a) when operation of the fuel cell system 10 shifts from the first operation to the second operation. This makes it possible to demonstrate the effects same as the effects of the fuel cell system 10 of the first embodiment, such as that the time taken to reach the target voltage after the end of the oxide layer removal treatment can be shortened as compared with the configuration of the aforementioned comparative example in which the oxide layer removal treatment is executed during execution of the first operation, and the voltage return response can be enhanced.

C. Other Embodiments

C1. Another First Embodiment

In each of the embodiments, step S105 may be omitted. That is, when the first operation shifts to the second operation, steps S115 or S115a may be executed irrespective of the oxide layer amount. In this configuration, a voltage value and a current value at the time of execution of step S115 or S115a, and a period of time and a frequency of the execution of step S115 or S115a may be set such that the level of deterioration (ease of dissolution) of the catalyst, identified from the voltage value and the like, falls within the life of the fuel cell 100 that is assumed in advance. Moreover, step S105 and step S110 may be executed in a reverse order.

C2. Another Second Embodiment

In each of the embodiments, step S120 may be omitted. Even in this configuration, the oxide layer removal treatment is executed during the normal operation with the FC current being equal to or less than a current threshold. Hence, the oxide layer can be removed, and the deterioration in fuel efficiency can be suppressed. Step S120 may be executed in place of step S105, and when the second condition is not satisfied, steps S110, S115 (S115a) may be executed. When the second condition is satisfied, steps S125, S130 may be executed. In this configuration, even though the shift from the first operation to the second operation is not executed, the oxide layer removal treatment is executed if the oxide layer amount reaches the second amount, on the assumption that the FC current is equal to or less than a current threshold. This makes it possible to suppress a considerable increase in the oxide layer amount.

C3. Another Third Embodiment

In each of the present embodiment, the first condition represents the condition that "the amount of an oxide layer generated on the catalyst of the cathode in each of the unit cells 110 is equal to or more than a first amount." However, the present disclosure is not limited to this. For example, the first condition may be a condition that "a predetermined first threshold time elapses from execution of the previous oxide film removal treatment." In this case, the effects same as those in each of the embodiments are also demonstrated by setting, as the first threshold time, the elapsed time corresponding to the first amount, that is, time Ta in FIG. 4. That is, an optional condition indicating the state where the amount of an oxide layer generated on the catalyst is equal to or more than the predetermined first amount may generally be set as the first condition.

Similarly, the second condition may also be a condition that "a predetermined second threshold time elapses from execution of the previous oxide film removal treatment." In this case, the effects same as those in each of the embodiments are also demonstrated by setting, as the second threshold time, the elapsed time corresponding to the second amount, that is, time Tb in FIG. 4. That is, an optional condition indicating the state where the amount of an oxide layer generated on the catalyst is equal to or more than a predetermined second amount that is larger than the first amount may generally be set as the second condition.

C4. Another Fourth Embodiment

In each of the embodiments, the fuel cell system 10 is mounted on a vehicle and used as a system for supplying electric power to the drive motor 20. However, the present disclosure is not limited to this. For example, the fuel cell system 10 may be mounted on other optional mobile objects, such as boats and airplanes, that require power supply for driving, and used therein. The fuel cell system 10 may be installed, for example, indoor or outdoor in offices or at home and used as a stationary power supply. Each of the unit cells 110 included in the fuel cell 100 are single cells for a polymer electrolyte fuel cell. However, the unit cells 110 may be configured as the single cells for various fuel cells, such as a phosphoric acid fuel cell, a fused carbonate fuel cell, and a solid oxide fuel cell.

C5. Another Fifth Embodiment

In each of the embodiments, some of the component members implemented by hardware may be implemented by software, and some of the component members implemented by software may conversely be implemented by hardware. For example, at least one functional unit of the flow control unit 610, the removal treatment execution unit 620, the first determination unit 630, and the second determination unit 640 may be implemented by an integrated circuit, a discrete circuit, or a module formed by integrating these circuits. When some or all of the functions of the present disclosure are implemented by software, the software (computer program) may be provided in the form stored in a computer-readable recording medium. A term "computer-readable recording medium" refers not only to a portable recording medium such as a flexible disk and a CD-ROM, but also to an internal memory in a computer, such as various kinds of RAMs and ROMs, and an external memory fixed to a computer, such as a hard disk. That is, the term "computer-readable recording medium" is broadly used to refer to any recording media that can permanently fix data packets.

Without being limited to the aforementioned embodiments, the present disclosure can be implemented in various configurations without departing from the meaning thereof. For example, technical features in the embodiments corresponding to the technical features in each aspect disclosed in SUMMARY can properly be replaced or combined in order to solve some or all of the aforementioned problems, or in order to accomplish some or all of the aforementioned effects. The technical features may properly be deleted unless otherwise specified as essential elements in this specification.

What is claimed is:
1. A fuel cell system, comprising:
a fuel cell including a catalyst;
an oxidant gas supply unit that supplies oxidant gas to the fuel cell;
a flow control unit configured to control a flow rate of the oxidant gas supplied to the fuel cell;
a removal treatment execution unit configured to execute an oxide layer removal treatment that removes an oxide layer generated on the catalyst when operation of the fuel cell shifts from an intermittent operation to a normal operation; wherein the oxide layer removal treatment increases a current in the fuel cell above a current required based on an output request to the fuel cell to reduce a voltage of the fuel cell,
a first determination unit configured to determine whether or not a first condition, indicating a state where an amount of the oxide layer generated on the catalyst is equal to or more than a predetermined first amount, is satisfied, wherein the removal treatment execution unit is configured to execute the oxide layer removal treatment, when the first condition is determined to be satisfied and the operation of the fuel cell system shifts from the intermittent operation to the normal operation;
a current measurement unit that measures the current of the fuel cell; and
a second determination unit configured to determine whether or not a second condition, indicating a state where the amount of the oxide layer generated on the catalyst is equal to or more than a predetermined second amount that is larger than the first amount, is satisfied, wherein the removal treatment execution unit is configured to execute the oxide layer removal treatment, when the normal operation is in execution, the second condition is determined to be satisfied, and the measured current is equal to or less than a predetermined current threshold;
wherein during the intermittent operation a current value of the fuel cell is zero and the flow rate is controlled to maintain the voltage of the fuel cell within a first voltage range that is lower than an open circuit voltage;
wherein during the normal operation a current value is larger than zero and the flow rate is controlled in response to the output request to the fuel cell;
wherein the removal treatment execution unit is configured execute the oxide layer removal treatment by increasing a current in the fuel cell to lower a voltage of the fuel cell to be within a predetermined second voltage range that is lower than the predetermined first voltage range.

2. The fuel cell system according to claim 1, further comprising a power supply circuit that regulates a current of the fuel cell, wherein the removal treatment execution unit is configured to execute the oxide layer removal treatment by controlling the power supply circuit to increase the current so as to adjust the voltage of the fuel cell to be within the second voltage range.

3. The fuel cell system according to claim 1, wherein the catalyst is included in a cathode of the fuel cell.

4. An oxide layer removal method for removing an oxide layer generated on a catalyst included in a fuel cell included in a fuel cell system, the method comprising:
executing an oxide layer removal treatment that removes the oxide layer by increasing a current of the fuel cell to be above a current required based on a request to the fuel cell, and adjusting a voltage of the fuel cell to be within a predetermined second voltage range lower than a predetermined first voltage range, the first voltage range being lower than an open-circuit voltage of the fuel cell, when an operation of the fuel cell system shifts from an intermittent operation, where a flow rate of an oxidant gas supplied to the fuel cell is controlled to maintain the voltage of the fuel cell within the first voltage range in a state where a current value of the fuel cell is zero, to a normal operation, where the current value is larger than zero and the flow rate of the oxidant gas supplied to the fuel cell is controlled in response to an output request to the fuel cell;
determining whether or not a first condition, indicating a state where an amount of the oxide layer generated on the catalyst is equal to or more than a predetermined first amount, is satisfied, and executing the oxide layer removal treatment, when the first condition is determined to be satisfied and the operation of the fuel cell system shifts from the intermittent operation to the normal operation; and
determining whether or not a second condition, indicating a state where the amount of the oxide layer generated on the catalyst is equal to or more than a predetermined second amount that is larger than the first amount, is satisfied, and executing the oxide layer removal treatment, when the normal operation is in execution, the second condition is determined to be satisfied, and the measured current is equal to or less than a predetermined current threshold.

* * * * *